(12) United States Patent
Steury

(10) Patent No.: US 12,158,174 B2
(45) Date of Patent: Dec. 3, 2024

(54) COVER FASTENER AND SYSTEM FOR FASTENING A COVER

(71) Applicant: PP4, LLC, New Paris, IN (US)

(72) Inventor: Doug Steury, New Paris, IN (US)

(*) Notice: Subject to any disclaimer, the term of this patent is extended or adjusted under 35 U.S.C. 154(b) by 416 days.

(21) Appl. No.: 17/555,434

(22) Filed: Dec. 18, 2021

(65) Prior Publication Data

US 2022/0196048 A1    Jun. 23, 2022

Related U.S. Application Data

(60) Provisional application No. 63/128,160, filed on Dec. 20, 2020.

(51) Int. Cl.
*F16B 2/22*    (2006.01)
(52) U.S. Cl.
CPC ..................... *F16B 2/22* (2013.01)
(58) Field of Classification Search
CPC ................ F16B 2/22; F16B 5/0692

USPC .......................... 150/154; 24/572.1
See application file for complete search history.

(56) References Cited

U.S. PATENT DOCUMENTS

| | | | | |
|---|---|---|---|---|
| 3,805,873 | A * | 4/1974 | Bloomfield | B44C 7/022 160/395 |
| 4,467,504 | A * | 8/1984 | Quist | F16B 5/0692 24/72.5 |
| 2005/0150101 | A1 * | 7/2005 | Langer | F16B 2/22 29/559 |
| 2020/0391651 | A1 * | 12/2020 | Alexander | B60J 7/104 |

\* cited by examiner

*Primary Examiner* — Sue A Weaver

(57) ABSTRACT

A cover fastener includes a resilient fastener body. The fastener body has a base with a front leg and a back leg. A fastener arm is connected to the base. The fastener arm has a front end with a finger, a back lever end and a fulcrum element having a pivot between the front end and the back lever end. The fulcrum element connects the fastener arm to the base at the pivot so that the fastener arm pivots on the fulcrum element relative to the base at the pivot. A plurality of fasteners is secured to a cover by sewing to provide a cover and system for fastening a cover.

5 Claims, 4 Drawing Sheets

COVER FASTENER AND SYSTEM FOR FASTENING A COVER

REFERENCE TO RELATED APPLICATION

This application claims priority to U.S. Application Ser. No. 63/128,160, filed Dec. 20, 2020, which is hereby incorporated by reference.

BACKGROUND OF THE INVENTION

Field of the Invention

The present invention relates generally to the field of fasteners and, more particularly, to a cover fastener and system for fastening a cover to an article.

Description of Related Art

A canvas cover or tarp is often used to protect patio furniture, grills, boats and other articles exposed to the elements. Such covers are often connected to the article by way of fasteners to provide a more secure form-fitting application. According to current methods, a cover fastener is secured to or integrally cast with a base element, as in the prior art devices of FIGS. 1-2. Most applications include a number of cover fasteners secured to the plastic base in a uniformly spaced and aligned arrangement. Rivets secure the plastic base to the vinyl cover or canvas, as shown in FIG. 1.

Referring to FIG. 2, this design makes the fastener too rigid and difficult for some to operate because the fastener cannot be easily released from the receiving channel. It functions like a two-piece lock with one-half secured to the vinyl or fabric cover. Women and children find the set up especially difficult because it requires an unreasonable amount of strength and dexterity to hold the part secured to the cover stable in order to release the fastener. This is especially the case in cold weather when hands are cold, covers contract and plastic is less pliable. A prying tool is often used to decouple the fastener from the receiving channel, which inevitably results in damage to the cover and fastener(s).

Another problem with covers and their fasteners is repair. Repair or replacement of existing cover fasteners requires that the cover be returned to the manufacturer for replacement. Depending upon the material, rivet holes in the vinyl or canvas can rarely be masked. When the base supporting newly replaced fasteners is repositioned on the cover care must be taken to cover over or trim away parts of the cover where holes are left. Often, the entire cover needs replacing. Cover and cover fastener repair or replacement adds cost, complications and man-hours to perform.

Thus, an improved cover fastener and system for fastening a cover are highly desirable. Such a fastener system should be simple and easy to operate and convenient to repair.

SUMMARY OF THE INVENTION

Generally, the new cover fastener includes a softer resilient monolithic fastener body that includes a fulcrum element connecting the base and top of the body enabling the top to pivot relative to the base. Additionally, because of the softer resilient fastener body, the forward extending planer portion of the front leg is machine sewn directly to the cover for a quicker, more streamlined and less expensive attachment. The entire back leg of the base is not secured to the cover and thus may be easily squeezed together to disengage and engage the receiving channel by hand.

One embodiment of the invention includes a cover fastener. The cover fastener has a resilient fastener body. The resilient fastener body has a base with a front leg and a back leg. A fastener arm is connected to the base. The fastener arm has a front end with a finger, a back lever end and a fulcrum element having a pivot between the front end and the back lever end. The fulcrum element connects the fastener arm to the base at the pivot so that the fastener arm pivots on the fulcrum element relative to the base at the pivot.

In another aspect of the invention, there is a system for fastening a cover to an article, which includes a plurality of resilient cover fasteners. Each of the cover fasteners includes a resilient fastener body. The fastener body has a base with a front leg and a back leg. The front leg of the base has a forward extending planer portion. A fastener arm is connected to the base. The fastener arm has a front end with a finger, a back lever end and a fulcrum element having a pivot between the front end and the back lever end. The fulcrum element connects the fastener arm to the base at the pivot such that the fastener arm pivots on the fulcrum element relative to the base at the pivot. The forward extending planer portion of each fastener body of each of the cover fasteners is secured directly to the cover to form a plurality of aligned cover fasteners, and a remaining portion of the front leg and the back leg of the base of each fastener body are not secured to the cover and are free to move relative to the cover. A receiver with a receiving channel is connected to the article to be covered by the cover and receives the finger of the front end of the fastener arm of each fastener body to releasably fasten the cover to the article. The finger of the front end of the fastener arm of each fastener body of each resilient cover fastener is released from the receiver when the back leg of the base and the back lever end of the fastener arm of each fastener body are squeezed together.

In still another aspect of the invention, there is a cover for fastening to an article. The cover includes a cover and at least one resilient cover fastener secured directly to the cover. The at least one cover fastener includes a resilient fastener body. The fastener body has a base with a front leg and a back leg. The front leg of the base has a forward extending planer portion that is secured directly to the cover, and a remaining portion of the front leg and the back leg of the base are not secured to the cover and are free to move relative to the cover. A fastener arm is connected to the base. The fastener arm has a front end with a finger, a back lever end and a fulcrum element with a pivot between the front end and the back lever end and the fulcrum element connects the fastener arm to the base at the pivot so that the fastener arm pivots on the fulcrum element relative to the base at the pivot.

It is an object of the present invention to provide an improved cover fastener and system for fastening a cover to an outdoor article. It is another object of the invention to provide a fastener system that is simple and easy to operate and convenient to repair. Related objects and advantages of the present invention will be apparent from the following description.

DETAILED DESCRIPTION OF INVENTION

Figure 1:
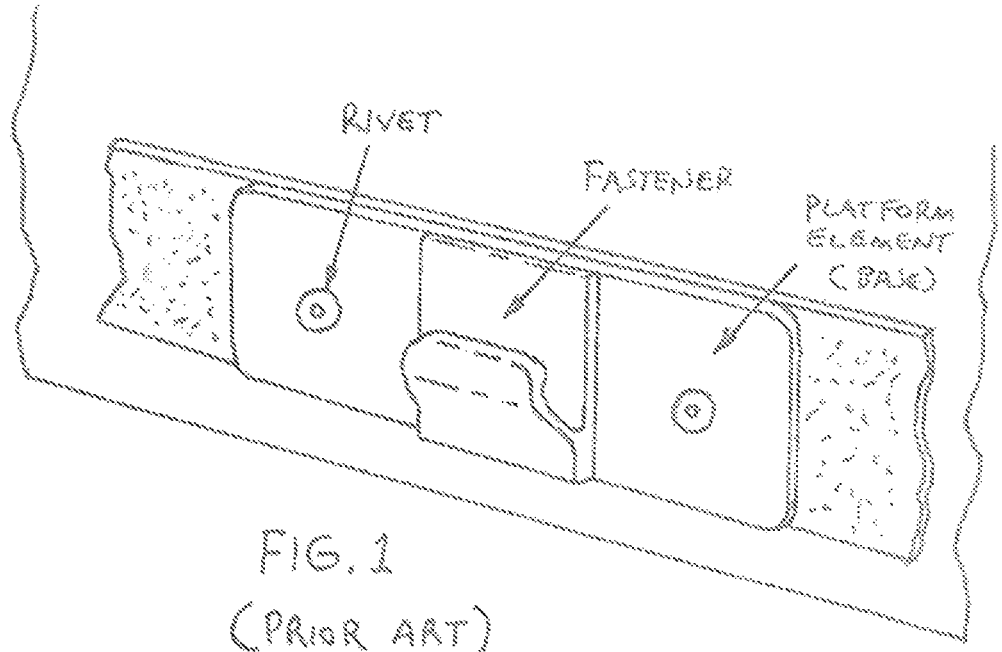
FIG. 1 is an isometric partial cut-away view of a prior art cover fastener and base, or platform element, connected to a cover by rivets.
Figure 2:
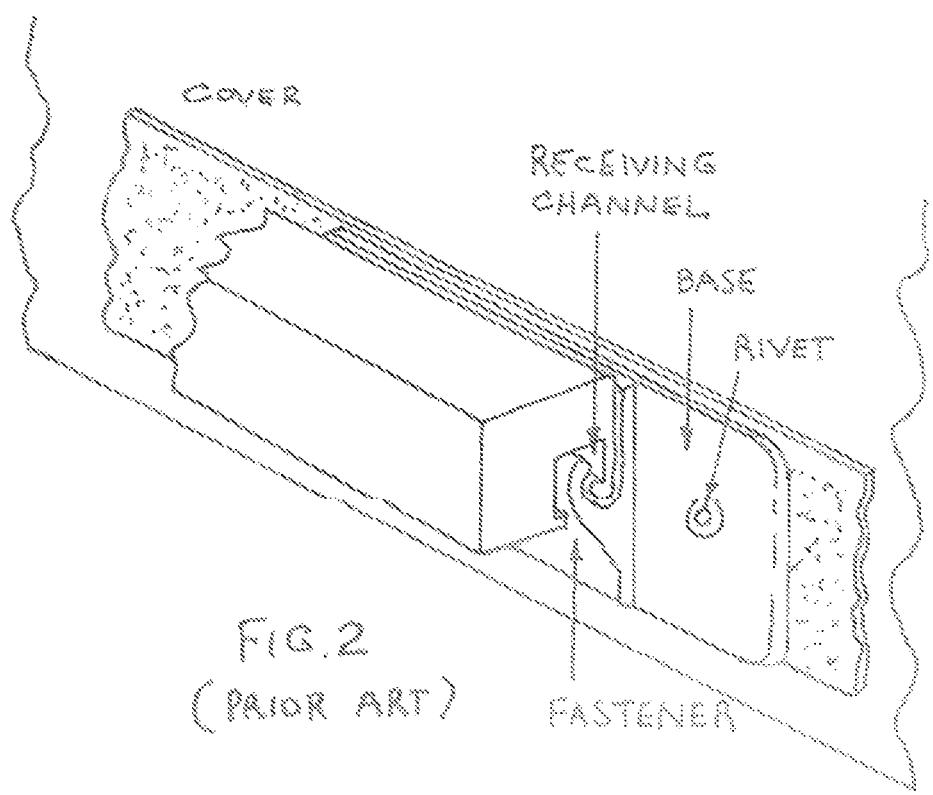
FIG. 2 is a side isometric partial cut-away view illustrating the prior art cover fastener of FIG. 1 shown secured to a receiving channel, which is typically secured to the outdoor article to be covered (not shown).
Figure 3:
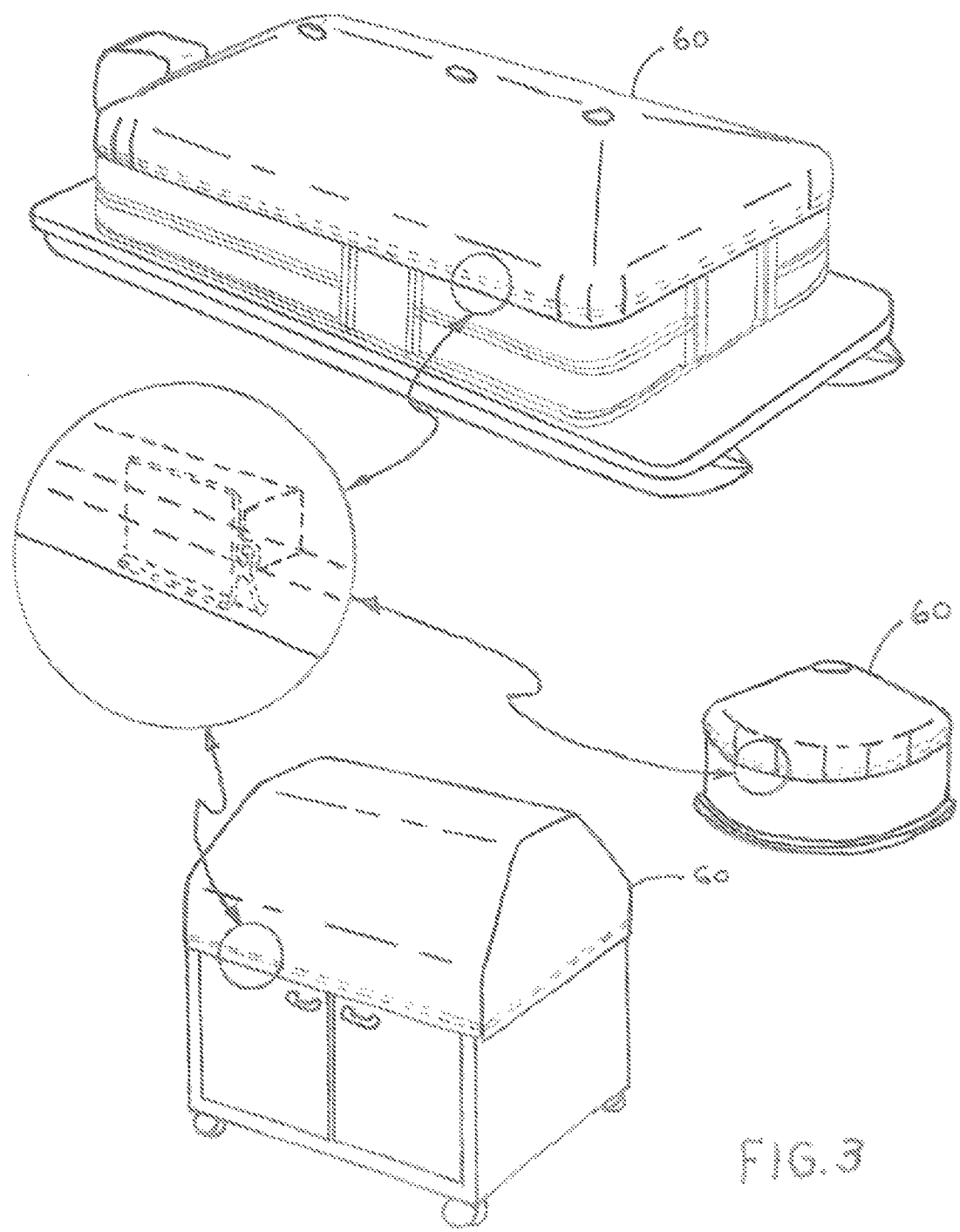
FIG. 3 shows isometric views of embodiments of the cover of the invention utilizing the cover fasteners and system covering a pontoon boat, a patio furniture piece and a grill, or barbeque. The circle shows an enlarged transparent view through the cover illustrating the fastener of the invention engaged in the receiving channel.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device(s) and such further applications of the principles of the invention as illustrated therein being contemplated as would normally occur to one skilled in the art to which the invention relates.

Figure 4:
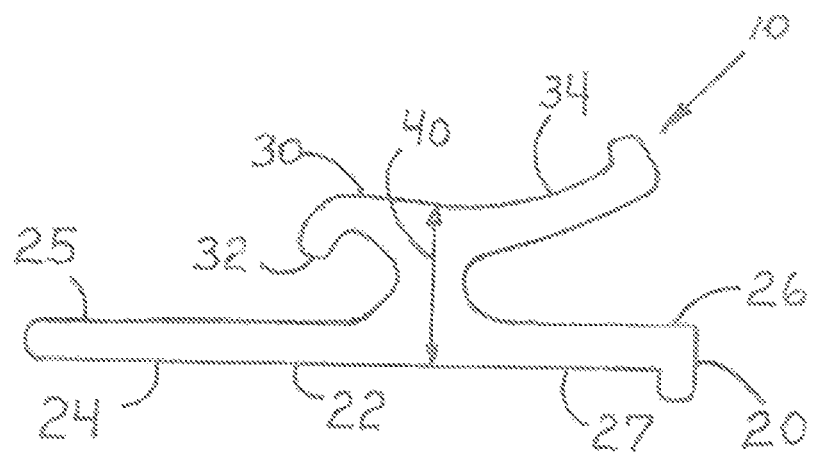
FIG. 4 is an isometric view of an embodiment of the cover fastener of the invention.
Figure 5:
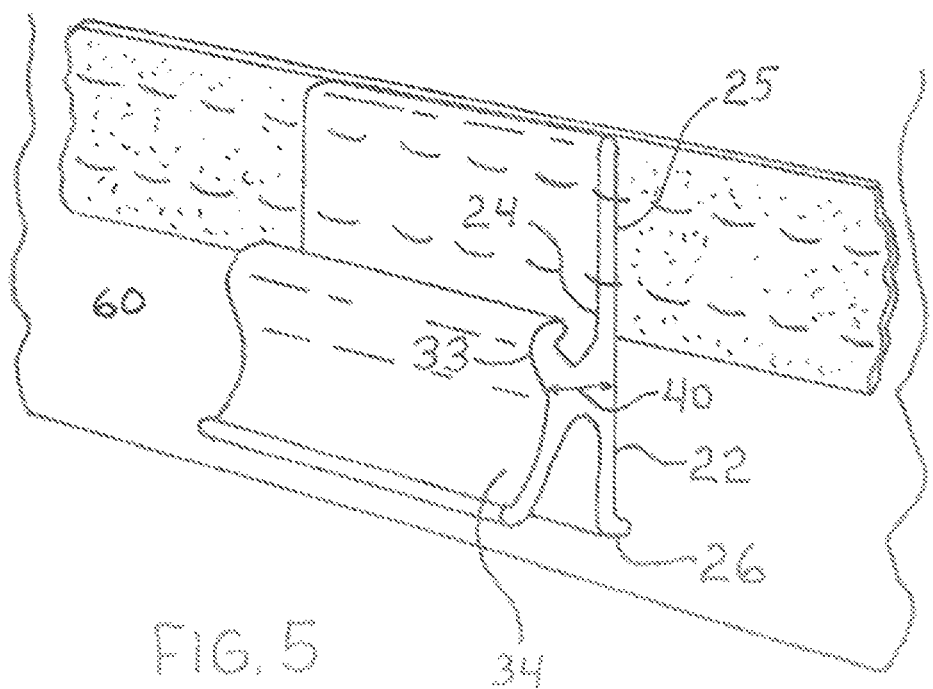
FIG. 5 is a side perspective view of an embodiment of the cover fastener of the invention shown secured directly to a cover by stitching with a reinforcing material.
Figure 6:
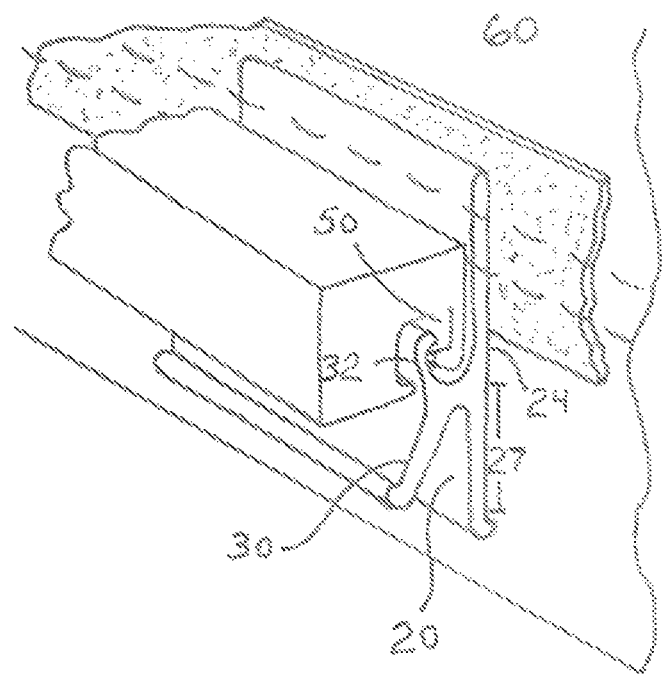
FIG. 6 is a side isometric partial cut-away view of the fastener showing the finger of the front end of the fastener arm in engagement with the receiving channel.

Referring to FIGS. 4-6, the cover fastener 10 includes a resilient fastener body 20 (FIG. 4). The fastener body has a base 22 with a front leg 24 and a back leg 26. The front leg of the base has a forward extending planer portion 25. A fastener arm 30 is connected to the base 22. The fastener arm 30 has a front end 32 with a finger 33, a back lever end 34 and a pivot 45 between the front end 32 and the back lever end 34. Preferably, the distal end of the finger has an enlarged bulb-like shape. A fulcrum element 40 connects the fastener arm 30 to the base 22 at the pivot 45. The fastener arm 30 can pivot on the fulcrum element 40 relative to the base 22 at the pivot 45 (See FIGS. 4-7).

A resilient fastener body 20, which can be manufactured in various densities depending on the application, defines the cover fastener 10. Preferably, the cover fastener 10 is formed from plastic. The cover fastener may be formed using any one of several processes known by skilled artisans. The fastener is formed by known methods of negative manufacturing, plastic injection or heat molding and/or plastic extrusion and cutting.

In the preferred embodiment, the fastener 10 is molded from a commercially produced composite material having a flexible property made from plastic, polymer, rubber and/or other material. The particular formula, preparation methods and constituent materials may vary depending upon the application, which may require more or less "flexing" of the fastener 10 of the invention, based upon for example, the material from which the cover is formed.

The fastener body 20 can be attached to the cover 60 using various methods, including sewing, rivets, adhesive and the like. Preferably, the forward extending planer portion 25 of the front leg 24 of the fastener body 20 is machine sewn directly to the cover 60 for a quicker, more streamlined and less expensive attachment. Specifically, the stitching is done by machine and a reinforcing element of material, such as a webbed belt, fabric weave, or the like, for example, is between the cover 60 and the cover fastener 10 to provide a sturdy reinforced attachment of the fastener to the cover, as shown in FIG. 5.

The resiliency of the back leg 26 of the base 22 and the back lever end 34 of the fastener arm 30 move the fastener arm at the pivot 45 to, in turn, move the finger 33 in and out of engagement with the receiving channel 50 when squeezed together (and released) by hand to thus fasten and unfasten the cover 60 from the article.

Referring to FIGS. 3 and 4-7, a system for fastening a cover made of fabric, vinyl or the like to an article, such as a grill, patio furniture, a boat or pontoon is provided. The system includes a plurality of the resilient cover fasteners 10. The forward extending planer portion 25 of each fastener body 20 of each of the resilient cover fasteners is secured directly to the cover 60 to form a plurality of aligned cover fasteners, like the one shown enlarged in FIG. 3. A remaining portion 27 and the back leg 26 of the base 22 of each fastener body 20 are not secured to the cover 60 and "float" freely relative to the cover 60 above its surface (See FIGS. 5-7).

In one embodiment, the receiving channel 50 includes an elongate channel formed from a rigid material, such as plastic or metal, and is connected to the article (e.g., grill, patio furniture piece, boat, pontoon) to be covered by the cover 60. The forward extending planer portion 25 of each fastener body 20 is secured directly to the cover by sewing to form a plurality of uniformly aligned cover fasteners in order to align with the long axis of the receiving channel 50. In that embodiment, the stitching is done by machine and a reinforcing element of material, such as a webbed belt, fabric weave, or the like, as already described, is between the cover 60 and the cover fastener 10 to provide a sturdy reinforced attachment of the fastener to the cover.

Figure 7:
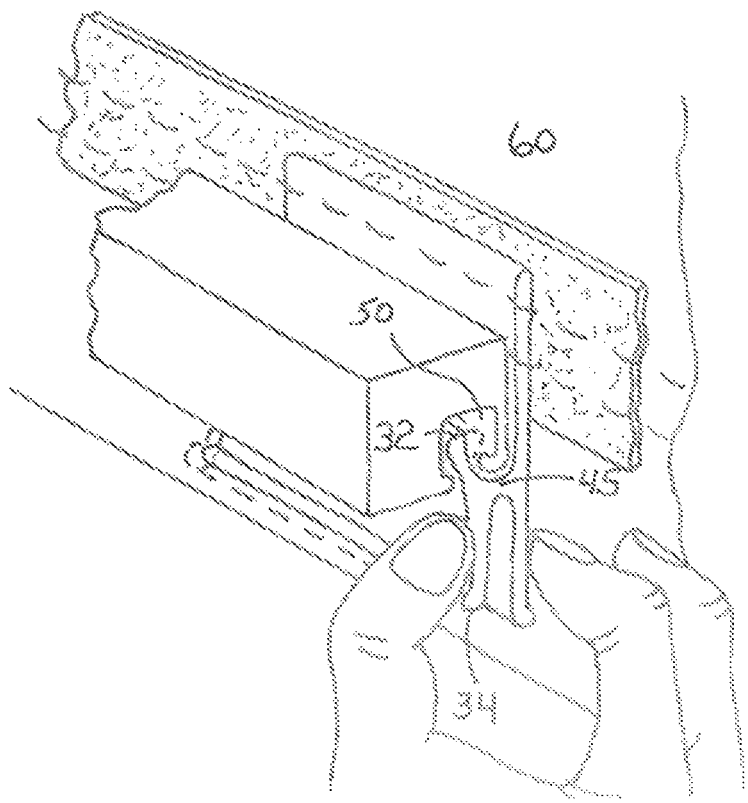
FIG. 7 is a side isometric partial cut-away view of an embodiment of the invention showing the back leg of the base and the back lever end of the fastener arm of the cover fastener being squeezed together to move the finger of the front end out of engagement with the receiving channel.

The receiving channel 50 is preferably shaped such that the distal end of the finger 33 fills the channel 50. Channel 50 is formed from a rigid material, such as plastic, metal or metal alloy and secured to the outdoor article using fastening means known by skilled artisans, such as bolts, screws or welding or other fasteners. In the exemplary embodiment, the receiving channel 50 is formed by way of extrusion of a metal alloy or aluminum, cut and sized to fit the application. The channel 50 receives the bulbous-shaped distal end of the finger 33 of the front end 32 of the fastener arm 30 of each fastener body 20 to releasably fasten the cover 60 to the article. The bulbous-shaped distal end 32 of the finger 33 is designed to substantially fill the receiving channel for an optimal fastening result. The finger 33 of the front end of the fastener arm 30 of each fastener body of each resilient cover fastener 10 is released from the receiving channel 50 when the back leg 26 of the base 22 and the back lever end 34 of the fastener arm 30 of each fastener body are squeezed together moving the finger 33 at the pivot 45 from engagement with the receiving channel 50, as shown in FIG. 7.

In another embodiment, a cover for fastening to an article includes a cover 60 and at least one resilient cover fastener 10 secured directly to the cover. As set out above, the at least one cover fastener 10 includes a resilient fastener body 20. The fastener body has a base 22 with a front leg 24 and a back leg 26. The front leg of the base has a forward extending planer portion 25 that is secured directly to the cover, preferably by sewing, as set out above, and a remaining portion 27 of the front leg 24 and the back leg 26 of the base 22 are not secured to the cover and "float" freely relative to the cover above its surface. A fastener arm 30 is connected to the base 22. The fastener arm has a front end 32 with a finger 33, a back lever end 34 and a pivot 45 between the front end and the back lever end. The distal end of the finger is preferably enlarged to a bulbous shape, as set out above, to substantially fill the receiving channel 50. A fulcrum element 40 connects the fastener arm 30 to the base 22 at the pivot 45, and the fastener arm can pivot on the fulcrum element relative to the base at the pivot in the manner described in detail in the above paragraphs.

As shown in FIGS. 4-7, the new cover fastener 10 includes a softer resilient fastener body 20. The front leg 24 of the base 22 has a forward extending planer portion 25. Because the fastener body 20 is formed from a soft resilient material, the planer portion 25 of the front leg 24 can be machine-sewn directly to the cover for a quicker, more streamlined and less expensive attachment without the use of rivets. This eliminates masking and cover replacement during repair, which saves time and material costs. The entire back leg 26 of the base 22 is not secured to the cover and thus may easily receive the fingers of a hand (FIG. 7) without requiring unreasonable strength and dexterity. The fulcrum element 40 connects the fastener arm 30 to the base 22 at the pivot 45 so that the fastener arm can pivot on the fulcrum element relative to the base at the pivot when the back leg of the base and the back lever end of the fastener arm are pressed together.

The new cover fastener and system enable the fastener arm 30 to be moved into and out of engagement with the receiver channel 50, which eliminates the need for prying tools that damage the fastener. The new cover fastener, system and cover resolve the problems of the prior art. The new system for fastening a cover to an article permits lever action to bring the back leg 26 of the base 22 and the back lever end 34 of the fastener arm 30 together so that a child can release the fastener(s) and cover and uncover a boat, grill or other covered outdoor article. The invention improves cover manufacture and cover fastening dynamics and deployment as a result.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Thus, it is understood that it is desirable to protect all the changes and modifications that come within the spirit of the invention.

The invention claimed is:

1. A cover fastener, comprising:
a resilient fastener body, the resilient fastener body has a base with a front leg and a back leg, the front leg is adapted to be capable of securing to a cover;
the fastener body includes a fulcrum element having a pivot formed between the front leg and the back leg;
the fulcrum element connects a fastener arm to the base, the fastener arm has a front end with a finger and a back lever end, and the pivot resides between the front end and the back lever end of the fastener arm; and
wherein, when the back leg of the base and the back lever end of the fastener arm are compressed together by hand, the fastener arm pivots on the fulcrum element relative to the base at the pivot so that the finger can be made to move in or out of engagement with an article to thus fasten or unfasten a cover to the article.

2. The cover fastener according to claim 1, wherein the front leg of the base has a forward extending planer portion that is secured directly to the cover, and a remaining portion of the front leg and the back leg of the base are not secured to the cover and are free to move relative to the cover.

3. The cover fastener according to claim 2, wherein a receiving channel is connected to an article to be covered by the cover, wherein the receiving channel receives the finger of the front end of the fastener arm to releasably fasten the cover to the article.

4. A system for fastening a cover to an article, comprising:
a plurality of resilient cover fasteners, each of the cover fasteners comprises a resilient fastener body, each of the fastener bodies has a base with a front leg and a back leg, the front leg of the base of each fastener body has a forward extending planer portion secured directly to a cover to form a plurality of aligned cover fasteners on the cover, and a remaining portion of the front leg and the back leg of the base of each fastener body are not secured to the cover and are free to move relative to the cover;
each fastener body includes a fulcrum element having a pivot formed between the front leg and the back leg;
the fulcrum element of each fastener body connects a fastener arm to the base, each of the fastener arms has a front end with a finger and a back lever end, and the pivot of each of the fulcrum elements resides between the front end and the back lever end of each fastener arm, wherein, when the back leg of the base and back lever end of each fastener arm are compressed together by hand, the fastener arm pivots on the fulcrum element relative to the base at the pivot so that the finger of each fastener arm can move in or out of engagement with a receiving channel connected to an article to thus fasten or unfasten the cover to the article.

5. A cover for fastening to an article, the cover comprising:
a cover; and
at least one resilient cover fastener secured directly to the cover, wherein the at least one cover fastener comprises: a resilient fastener body, the fastener body has a base with a front leg and a back leg, the front leg of the base has a forward extending planer portion that is secured directly to the cover, and a remaining portion of the front leg and the back leg of the base are not secured to the cover and are free to move relative to the cover; a fulcrum element having a pivot is formed between the front leg and back leg of the base, the fulcrum element connects a fastener arm connected to the base, the fastener arm has a front end with a finger and a back lever end, and the pivot resides between the front end and the back lever end of the fastener arm, wherein, when the back leg of the base and the back lever end of the fastener arm are compressed together by hand, the fastener arm pivots on the fulcrum element relative to the base at the pivot so that the finger can be made to move in or out of engagement with a receiving channel connected to the article to thus fasten or unfasten the cover to the article.

* * * * *